United States Patent

[11] 3,571,499

[72] Inventors Robert B. Hansen
Arlington Heights;
William H. Slavik, Oak Lawn; Arthur F. Seymour, Schaumburg, Ill.

[21] Appl. No. 811,887
[22] Filed Apr. 1, 1969
[45] Patented Mar. 16, 1971
[73] Assignee Motorola, Inc.
Franklin Park, Ill.

[54] AUTOMATIC SATURATION CONTROL FOR A COLOR TELEVISION RECEIVER
14 Claims, 2 Drawing Figs.

[52] U.S. Cl. .......... 178/5.4
[51] Int. Cl. .......... H04n 9/48
[50] Field of Search .......... 178/5.4, 5.4 (ACC), 5.4 (4) (C) (3)

[56] References Cited
UNITED STATES PATENTS
3,267,210 8/1966 Townsend .......... 178/5.4

*Primary Examiner*—Robert L. Richardson
*Attorney*—Mueller, Aichele & Rauner

ABSTRACT: A color television receiver using direct demodulation of the color and brightness signals is provided with an automatic chroma control circuit for controlling the gain of the color IF amplifier stage in order to prevent the saturation of the demodulated color signals from exceeding the peak brightness signals. The output of the video amplifier is supplied through a peak detector to one input of a differential amplifier, the other input to which is obtained through a second peak detector from the outputs of the color demodulators. The output of the differential amplifier is used to control a switching transistor, which supplies D.C. control signals to the color IF amplifier to control the bias on the final stage thereof.

A pair of comparison circuits of the same type are provided, with the second circuit being responsive to the peak blackness signals and the saturation of the color components occurring during the black-going portions of the video signals, while the first comparison circuit compares the white-going peak portions of the video signal with the saturated color appearing during the white-going portions. The blanking circuit operates to disable the comparison circuits during the blanking intervals, so that the automatic chroma control circuit is responsive only to the video signals present during the trace portion of the video signal.

Patented March 16, 1971 3,571,499

2 Sheets-Sheet 1

INVENTORS.
ROBERT B. HANSEN
WILLIAM H. SLAVIK
ARTHUR F. SEYMOUR

BY Mueller, Aichele & Rauner
ATTORNEYS.

INVENTORS.
ROBERT B. HANSEN
WILLIAM H. SLAVIK
ARTHUR F. SEYMOUR

BY Mueller, Aichele & Rauner
ATTORNEYS.

AUTOMATIC SATURATION CONTROL FOR A COLOR TELEVISION RECEIVER

BACKGROUND OF THE INVENTION signal

The N.T.S.C. color television signal presently in use includes a wide band brightness or luminance Y signal and a modulated subcarrier signal of approximately 3.58 mHz. The subcarrier signal is phase and amplitude modulated by color difference signals (R–Y, B–Y, and G–Y), so that phases of the subcarrier each represent the hue or color of an image portion and the subcarrier amplitude at that phase represents the saturation of that color. A monochrome receiver visibly reproduces only the Y-component.

The usual color television receiver includes a demodulator for synchronously recovering the color difference signals which then are added to the Y-signal for developing the red, blue and green representative signals to be reproduced by the cathode ray tube. By applying a properly phased reference signal of the subcarrier frequency to a balanced synchronous demodulator and applying the brightness signal components in the same phase to each input of the demodulator, it is possible to provide directly the red, blue and green representative video signals, thereby avoiding the separate recovery and combination of the brightness signal with the demodulated color difference signals.

In most color television receivers a manually adjustable control is provided for varying the gain of the color IF amplifier in order to control the intensity or saturation of the reproduced color signals relative to the brightness signal components. When changing from one channel to another, it often becomes necessary to readjust the color intensity or saturation control due to the different signal levels transmitted by different transmitting stations; so that manual adjustment of the saturation of color television receivers has been accepted as a bothersome but necessary element of the receiver.

Provisions have been made for automatic chroma control or automatic control of the saturation of the color signal by providing a comparison of the amplitude of the color burst portion of the transmitted signal with the line synchronizing pulse. This comparison then is used to automatically adjust the gain of the color amplifier stages to a predetermined level which should prevent oversaturation of the colors and yet provide proper adjustment of the saturation level for signals from different stations. A problem in using the comparison of the color burst to the line synchronizing pulses for color control exists due to variations in the amplitudes of these signals from different transmitting stations, although the amplitudes are theoretically the same from all transmitting stations. As a consequence, it is desirable to provide an automatic color saturation control circuit which operates responsive to the received video signal during the scanning intervals and which is not dependent upon the color burst signal.

SUMMARY OF THE INVENTION

Accordingly it is an object of this invention to automatically control the saturation of a color television receiver in response to the received video signal during the scan intervals.

It is an additional object of this invention to provide an automatic saturation control for a color television receiver by comparing the peak brightness signal components with the peak demodulated color signal components and to control the gain of the color IF amplifier stages in accordance with the output of this comparison.

It is a further object of this invention to automatically control the gain of the color IF amplifier stage of a color television receiver in response to the output of a comparison circuit which compares the peak amplitude of the brightness signal components with the peak amplitude of the demodulated color signals.

It is another object of this invention to automatically control the saturation of a color television receiver by preventing the peak amplitude of the demodulated color signal from exceeding the peak amplitude of the brightness signal components.

In accordance with a preferred embodiment of this invention, an automatic chroma or color saturation control is provided by comparing the peak amplitude of the brightness signal components with the peak amplitude of the demodulated color signal to obtain an output signal representative of the relative amplitudes of the compared signals. This output signal then is utilized by a control means for controlling the operation of the color processing channel.

More specifically, the comparison is effected by a differential amplifier which provides a first output whenever the peak amplitude of the demodulated color signal exceeds the peak amplitude of the brightness signal components and which provides a second output signal whenever the peak amplitude of the brightness signal components exceeds the peak amplitude of the color signal components. The output of the differential amplifier is supplied through a control circuit, which in turn provides a signal to the color IF amplifier stage to control the D.C. operating bias to thereby control the gain in order to prevent the peak amplitude of the demodulated color signal from exceeding the peak amplitude of the brightness signal components.

DETAILED DESCRIPTION

Figure 1:
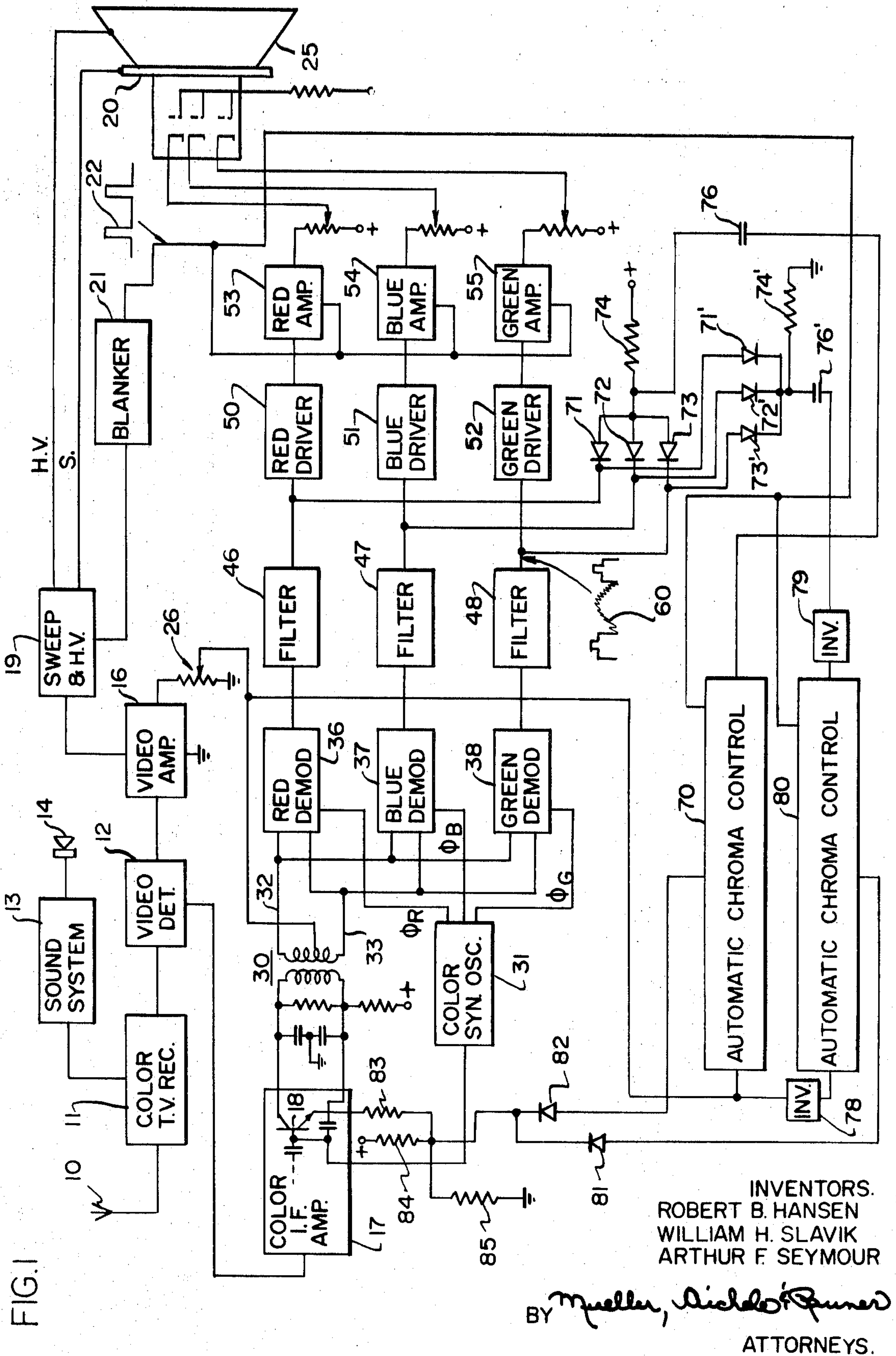
FIG. 1 is a block diagram of a preferred embodiment of this invention.

Referring now to FIG. 1 of the drawing, there is shown a color television receiver 11 coupled to a suitable antenna 10 for receiving a composite television signal and for selecting amplifying and converting the radiofrequency signal to IF frequency for application to a video detector 12. The color television receiver 11 also is coupled to a sound system 13 which demodulates and amplifies the usual 4.5 mHz sound subcarrier for reproduction by a speaker 14 as the audio signals of the received composite signals applied by the antenna 10 to the receiver 11.

The video detector 12 is coupled to a video amplifier 16 and a color IF amplifier 17 including as a final amplifier stage therein an NPN transistor 18. Brightness signal components of the received composite television signal are processed by the video amplifier 16 while the modulated chroma or color signal components are processed by the color IF amplifier 17. The video amplifier 16 supplied signals to a sweep and high voltage circuit 19, which has an output connected to a deflection yoke 20 located on the neck of a three-gun color cathode ray tube 25. The sweep and high voltage system 19 also provides a high voltage for the screen of the shadow mask of the cathode ray tube 25 in a conventional manner and, in addition, supplies signals to a blanker circuit 21, the output of which is a series of positive blanking pulses 22, which appear during the retrace intervals of the received video signals.

The output of the color IF amplifier stage 17, taken from the collector of the final amplifier transistor 18, is supplied at opposite phases with respect to ground to the primary winding of an output transformer 30. The output of the IF amplifier 17, taken from the stage preceeding the transistor 18, also is further coupled to a color synchronizing oscillator 31, which selects the burst signals appearing on the "back porch" of the horizontal synchronizing pulses in order to develop a color reference signal of 3.58 mHz at three different phases for synchronous demodulation of the color signals. The three outputs of the oscillator 31 are identified as R, B and G to designate the required phases for demodulating the red, blue and green colors of the modulated color signal components, respectively.

The output of the video amplifier 16, representing the processed brightness signal information, is supplied from the tap of a contrast control potentiometer 26 to the center tap of the secondary winding of the transformer 30. It should be noted that the brightness signal components obtained from the tap of the potentiometer 26 may extend in frequency up to or into the color subcarrier sidebands.

A pair of output leads 32 and 33 are provided for the secondary winding of the transformer 30, with both of these leads carrying the same brightness signal components with respect to ground since these components are applied to the center tap of the secondary winding of the transformer 30. At the same time, the lead 32 carries the modulated color subcarrier of one phase, while the lead 33 carries the modulated color subcarrier of the opposite phase. These modulated color subcarrier signals are oppositely phased with respect to ground, as stated previously, and are phase-modulated to represent the different hues of the color signals and are amplitude modulated to represent the saturation. The leads 32 and 33 each are coupled to three direct color signal demodulators 36, 37 and 38. In addition, the red, blue and green phase reference signals from the output of the color sync oscillator 31 are applied to the demodulators 36, 37 and 38, respectively, in order to provide direct demodulation of the signals applied to the inputs of these demodulators.

The outputs of the demodulators 36, 37 and 38 are supplied through associated filters 46, 47 and 48, which are provided to trap the 3.58 mHz reference signal and to pass the desired red, blue and green video output signals to three driver circuits 50, 51 and 52, respectively. The waveform supplied to the driver circuits from the filter 48 is represented as the waveform 60 shown as being obtained from the output of the filter 48; and at this stage of the receiver, the white-going portions of the signal appear as negative-going portions, whereas the black-going portions of the signal appear as positive going portions of the waveform 60.

Three amplifier circuits, 53, 54 and 55 are driven by the outputs of the driver circuits, and the output of each amplifier circuit is coupled through a potentiometer to the corresponding cathode of the three-beam cathode ray tube 25. Associated grids of these cathodes are coupled to a suitable bias source, and the tube 25 operates in accordance with well-known shadow mask principles to reproduce a monochrome or full color image in accordance with the video drive signals applied to it.

It should be noted in conjunction with the foregoing description, that additional circuitry commonly employed in color television circuits has not been disclosed in order to simplify this disclosure. For example, there may be a gated automatic gain control system, a color killer system for interrupting the amplifier 17 in the absence of color signals, as well as other circuitry now known in commercially produced color television receivers. It further should be noted that it is preferable for the video detector 12 to be direct current coupled through all of the succeeding amplifiers and demodulators directly to the cathodes of the picture tube 25 in order to maintain the D.C. component of the signals processed in the various translation paths.

In the circuit described thus far, the conventional manual control for adjusting the bias on the emitter of the final output amplifier transistor 18 in the color IF amplifier stage 17 has not been provided. In its place, a signal obtained from an automatic saturation or automatic chroma control circuit is utilized with the automatic saturation control circuit being in the form of a pair of peak comparison circuits 70 and 80.

The inputs for the circuits 70 and 80 are obtained from the output tap on the contrast control potentiometer 26 and from the outputs of the demodulators 36, 37 and 38 after passing through the filters 46, 47 and 48. The outputs of the filters 46, 47 and 48 are applied through OR gates consisting of three diodes, 71, 72 and 73 and 71', 72', 73', with the diodes 71, 72 and 73 being connected so that the cathodes thereof are connected to the outputs of the filters, and the anodes are connected in common through a resistor 74 to a source of positive potential. The anodes of the diodes 71', 72' and 73' are connected to the outputs of the filters and cathodes are connected in common through a resistor 74' to ground potential.

From an examination of the waveform 60, it may be noted that the diodes 71, 72 and 73 are caused to be biased in the forward conducting direction by white-going information and are caused to be back-biased by black-going information. The junction of the diodes 71, 72 and 73 is connected through a coupling capacitor 76 to the right-hand inputs of the comparison circuits 70 and 80, with the left-hand inputs of the circuits 70 and 80 being connected to the tap on the potentiometer 26.

It should be noted that the inputs to the comparison circuit 80 from the diodes 71', 72' and 73' and the potentiometer 26 are applied through a pair of inverters 78 and 79, so that the circuit 80 responds in an opposite manner to the response of the comparison circuit 70. As a result, the comparison circuit 70 compares the peak level of the demodulated color signals obtained from the demodulators 36, 37 and 38 with the peak brightness level for white-going information and provides an output whenever the amplitude of the color signal obtained from the outputs of any one of the filters 46 to 48 exceeds the peak level of the Y signal obtained from the potentiometer 26 for white-going information.

The comparison circuit 80 provides a comparable output for black-going Y information, and the outputs of the comparison circuits 70 and 80 are coupled through a third OR gate, consisting of a pair of diodes 81 and 82, and an emitter resistor 83 to the emitter of the final IF amplifier transistor 18. The normal operating bias for the emitter of the transistor 18 is obtained from a voltage divider consisting of a pair of resistors 84 and 85 connected between a source of positive potential and ground, with the junction of the resistors 84 and 85 being connected to the junction between the resistor 83 and the diodes 81 and 82.

Thus, it is apparent that as the voltage obtained from the outputs of the diodes 81 and 82 varies, the D.C. operating potential present on the emitter of the transistor 18 also varies. This results in variations of the gain of the transistor 18, so that the circuit operates to provide an automatic chroma or saturation control to prevent the saturation of the demodulated color signals from exceeding the peak intensity of the brightness signal components.

Figure 2:
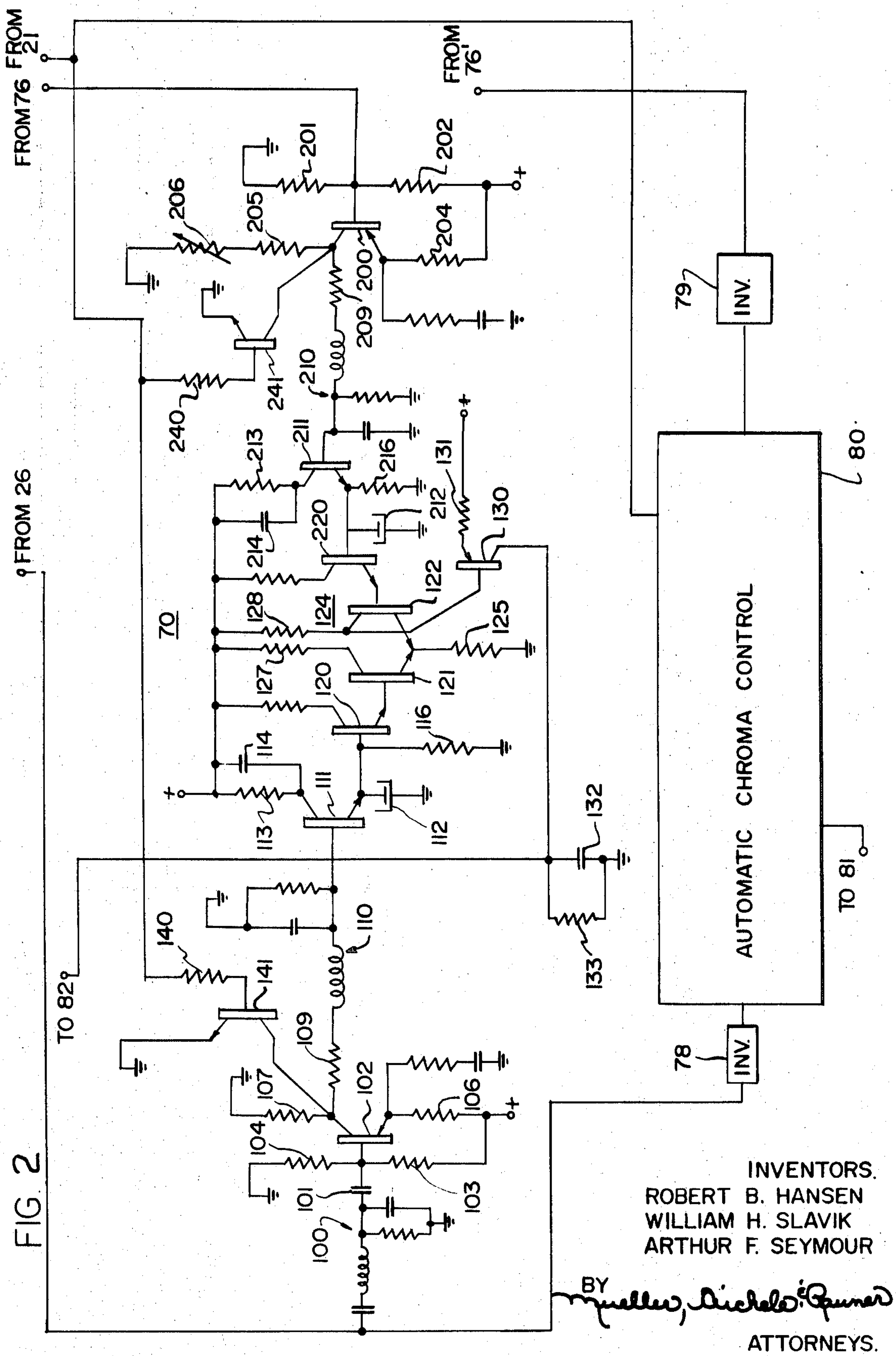
FIG. 2 is a schematic diagram of the automatic saturation control circuit used in the color television receiver shown in FIG. 1.

Referring now to FIG. 2, there is shown a detailed circuit diagram of one of the comparison circuits 70 or 80. The circuits 70 and 80 are identical so that only the comparison circuit 70 has been shown in FIG. 2 but the description applies equally as well to the circuit 80. The brightness signal components for the circuit 70 are applied to a rolloff filter circuit 100 at the left-hand input to the comparison circuit shown in FIG. 2. The rolloff filter circuit 100 is provided to eliminate 3.58 kHz. signal components, and the signals obtained from the circuit 100 are applied through a coupling capacitor 101 to the base of a PNP transistor 102. A D.C. operating bias for the base of the transistor 102 is obtained from a voltage divider consisting of a pair of resistors 103 and 104 connected between a source of positive potential and ground. Emitter potential for the transistor 102 is obtained from a source of B+ through a resistor 106, and the collector is connected through a collector resistor 107 to ground.

The collector of the transistor 102 also is connected through a coupling resistor 109 and a second rolloff filter circuit 110 to the base of an NPN emitter follower transistor 111. The second rolloff filter circuit 110 is provided in order to pass only signal components below 500 kHz. in order to eliminate the affects of transients and noise pulses in the signals obtained from the contrast control potentiometer 26 shown in FIG. 1.

It should be noted that brightness signal components in the white-going direction are applied as negative-going signals to the rolloff filter circuit 100 and tend to forward-bias or increase the conductivity of the PNP transistor 102. This in turn causes a more positive potential to be applied to the base of the NPN transistor 111 from the collector of the transistor 102 for white-going information, thereby driving the transistor 111 heavier into conduction.

The collector of the transistor 111 is connected through a relatively low-impedance resistor 113 to a source of B+ potential, and the collector-emitter path of the transistor 111 provides a charging path for a peak signal responsive integrating capacitor 112 connected between the emitter of the transistor 111 and ground. In order to enhance the response of the circuit to peak signals passed through the filters 100 and 110, a bypass capacitor 114 is connected across the resistor 113; so that when the transistor 111 initially is turned on, the B+ potential effectively is connected directly to its collector providing a short circuit charging path to the capacitor 112 dependent only upon the resistance of the transistor 111 as the initial charging resistor in the charging path. The capacitor 112 is part of an integrating circuit having a long time constant and also including a resistor 116 connected between ground and the junction of the emitter of the transistor 111 with the capacitor 112. The resistor 116 is of high resistance value compared to the resistor 113, and the discharge path for the capacitor 112 through this high impedance provides a long time constant of the order of several seconds to several minutes for the discharge of the capacitor 112. The potential on the capacitor 112 is coupled through a second emitter-follower circuit 120 to the base of an NPN transistor 121 which forms one half of a differential amplifier 124 having a second NPN transistor 122 therein. The emitters of the transistors 121 and 122 are connected together through an emitter-resistor 125 to ground, and the collectors of the transistors 121 and 122 are connected to the source of B+ through collector resistors 127 and 128, respectively.

The differential amplifier 124 operates in a conventional manner; so that whenever the transistor 121 is conductive, the transistor 122 is nonconductive and vice versa. For purposes of illustration, assume that the transistor 121 is conductive, which condition is indicative that the peak amplitude of the video brightness signals obtained from the tap on the potentiometer 26 exceeds the peak amplitude of the demodulated color signals detected in the OR gate consisting of the diodes 71, 72 and 73. As a result, the transistor 122 is nonconductive; so that a relatively high positive potential is obtained from the collector of the transistor 122 which forms the output circuit for the amplifier 124. This high positive potential is applied to the base of a PNP switching transistor 130, the emitter of which is connected through a coupling resistor 131 to a source of positive potential and the collector of which is connected to an integrating circuit consisting of a capacitor 132 and a resistor 133, connected between the collector of the transistor 130 and ground.

The junction between the collector of the transistor 130 and the integrating circuit 132, 133 is coupled through the diode 82 (for the comparison circuit 70) in the OR gate 81, 82 to the junction of the resistors 83, 84 and 85 coupled to the emitter of the final IF amplifier transistor 18. For the condition just described when the transistor 122 is nonconductive, the transistor 130 acts as an open switch and permits the integrating capacitor 132 in the integrating circuit to discharge through the resistor 133. The time constants of the capacitor and the resistor 133 are such that the full discharge of the capacitor 132 extends over several scanning intervals or lines of the received television signals.

In the event that the capacitor 132 is fully discharged, the automatic saturation control circuit 70 operates as if it were not placed in the circuit for the television receiver shown in FIG. 1. In this condition, the gain of the color IF amplifier stage including the transistor 18 is controlled solely by the value of the resistors 84 and 85 in the voltage divider connected to the emitter of the transistor 18. The values of these resistors are chosen to be such that the total gain of the IF amplifier 17 is sufficient to oversaturate the signal obtained from the outputs of the demodulators 36, 37 and 38. That is, in this condition of operation, the gain of the IF amplifier stage 17 is sufficient to cause the demodulated color signal peaks to exceed the peak brightness signal levels of the brightness signal obtained from the contrast control potentiometer 26.

As stated previously in conjunction with the description of the operation of the circuit shown in FIG. 1, the output signals obtained from the OR gate 71, 72, 73 and applied through the coupling capacitor 76 are representative of the amplitudes of the signals obtained from the demodulators 36, 37 and 38. White-going signals, as described previously, cause the diodes 71, 72 and 73 to conduct, and the one of the filters 46, 47 and 48 which has an output containing the most white-going signal (most saturated) causes its associated diode 71, 72 or 73 to be rendered the most fully conductive. The most conductive diode then causes a corresponding current to flow from the source of positive potential through the resistor 74 and through the diode, causing a varying biasing potential to be applied to the base of a PNP input transistor 200 through the coupling capacitor 76.

The more current that flows through this resistor 74, the more negative is the biasing potential applied to the base of the transistor 200; and this potential is coupled to the base of the transistor 200 which is provided with a D.C. operating level through a voltage divider consisting of a pair of resistors 201 and 202 connected between a source of B+ and ground. The emitter of the transistor 200 is connected through an emitter-resistor 204 to the source of B+ potential and the collector of the transistor 200 is connected through a collector-resistor 205 and a variable resistor 206 to ground. The variable resistor 206 is provided in order to accurately adjust the desired switching level of the differential amplifier 124 in order to obtain the proper control signals from the output of the comparator circuit.

As the transistor 200 is rendered more conductive by increased white-going (negative) color signals (*i.e.*, more saturated) obtained from the outputs of the filters 46, 47 and 48, the potential on the collector of the transistor 200 becomes more positive. The potential present on the collector of the transistor 200 is applied through a rolloff filter 210 which is comparable to the filter 110 and is used to pass only signals below 500 kHz. in order to eliminate deleterious effects due to noise and transient signal conditions. The filtered signals obtained from the transistor 200 then are applied to the base of an NPN emitter-follower transistor 211 which is rendered more conductive by the positive-going potential on the collector of the transistor 200, which is the condition for more saturated signals obtained from the outputs of the filters 46, 47, 48.

The collector of the transistor 211 is connected to a source of B+ through a collector resistor 213, and the emitter is connected to ground through a peak detecting integrating circuit including a capacitor 212 and a resistor 216, with the collector resistor 213 being shunted by a capacitor 214. The capacitor 214 serves a function similar to the function served by the capacitor 114 to provide a rapid charging path for the capacitor 212. Like the resistor 116, the resistor 216 is of high impedance in order to provide a long discharge time for the capacitor 212 whenever the transistor 211 is rendered nonconductive or less conductive.

It should be noted that the peak detection integrating circuit consisting of the capacitor 212 and the resistor 216 is substantially identical to the integrating circuit consisting of the capacitor 112 and resistor 116 and provides a similar time constant. The charge present on the capacitor 212 is used to control the conductivity of an NPN emitter-follower transistor 220, which in turn is connected to the base of the transistor 122 in the differential amplifier 124 to render the transistor 122 conductive when the charge on the capacitor 212 exceeds the charge on the capacitor 112.

Whenever the transistor 122 is rendered conductive, which indicates that the peak saturation of at least one of the demodulated color signals exceeds the peak amplitude of the brightness signal components, the transistor 122 provides a more negative potential on its collector which tends to bias the transistor 130 into conduction, causing the integrating capacitor 132 to be charged from the source of B+ through the resistor 131 and the transistor 130. This causes an increasing potential to appear on the capacitor 132 and is applied through the diode 82 shown in FIG. 1 to the junction between the resistors 84 and 85 in the voltage divider.

Since the transistor 18 is an NPN transistor, increasing the voltage at the junction of the resistors 84 and 85, tends to reduce the bias on the transistor 18, thereby reducing the gain of the IF amplifier 17, which in turn operates to reduce the saturation of the demodulated signals obtained from the outputs of the demodulators 36 through 38 and the filters 46, 47 and 48.

The time constants of the integrating circuits 112, 116 and 212, 216 are chosen to be relatively long, so that the correction signals are applied on the basis of true peak signals in the picture content over several frames to prevent undesirable and unnecessary adjustment of the gain of the IF amplifier 17. The integrating circuit 132, 133 is provided so that the switching of conductivity of the transistors 121 and 122 in the differential amplifier 124, does not produce sudden and extreme changes in the gain of the IF amplifier 17 which would result in sudden changes in the saturation of the signal as viewed by a viewer on the screen of the cathode ray tube 25 if this integrating circuit were not present.

Although the foregoing description has been limited to the description of operation of the circuit 70 for white-going signals, it should be apparent that the same operation of the comparison circuit 80 exists for black-going signals, with the input signals being inverted; so that the signals which cause the transistors 102 and 200 to be rendered more conductive in the foregoing description will cause comparable transistors in the black level comparison circuit 80 to be rendered less conductive. Conversely, signals which rendered either of the transistors 102 or 200 less conductive in the preceeding description render corresponding transistors in the black level comparison circuit 80 more conductive.

The two comparison circuits are provided since the saturation of red and yellow color signals is more readily apparent when they exceed the white-going brightness components, and the saturation of the blue and green color signals becomes more readily apparent when black-going brightness or a relatively dark picture condition exists. Since the eye detects the saturation of the red and yellow components before it detects saturation of the blue and green components, it may be possible to utilize only a single comparator circuit, such as the comparison circuit 70 which compares the output of the peak white signal with the peak white-going saturation signals obtained from the demodulators 36, 37 and 38, to provide sufficient control of the saturation of the color signals.

In order to prevent erroneous operation of the comparison circuits 70 and 80 during blanking intervals when the blanking pulses 22 are obtained from the output of the blanker 21, the blanking pulses are applied to both inputs of the comparison circuits to squelch the operation of the comparison circuits. These are the same blanking pulses which are applied to the red, blue and green output amplifiers 53, 54 and 55 to cut off the cathode ray tube 25. In the comparison circuit 70, the blanking pulses are applied through a pair of coupling resistors 140 and 240 to the bases of a pair of NPN transistor amplifiers 141 and 241, the emitters of which are connected to ground and the collectors of which are connected, respectively, to the collectors of the transistors 102 and 200.

During the scan intervals of operation of the television receiver, the transistors 141 and 241 are nonconductive since the potential applied to their bases is ground potential. When a positive blanking pulse 22 appears, however, the transistors 141 and 241 are driven hard into conduction causing the potential appearing at the collectors of the transistors 102 and 200 also to be clamped to ground potential. This allows no information to enter the low pass networks 110 and 210 during blanking time. The time constant of the capacitors 112 and 212, due to resistors 116 and 216 respectively is sufficiently long that there is virtually no change in differential amplifier 124 output due to the blanking of input signals. Thus the circuit "remembers" the last correction during blanking intervals.

We claim:

1. In a color television receiver for a composite signal comprising brightness signal components of a television image and a subcarrier signal phase-modulated by color difference signals to represent hue and amplitude-modulated to represent saturation, said receiver having a brightness signal component processing channel and a color signal component processing channel including a demodulator for obtaining at least one signal representing one hue, an automatic saturation control circuit including in combination:
   first means for obtaining a signal representative of the peak brightness of the brightness signal components;
   second means for obtaining a signal representative of the peak saturation of at least one phase of the demodulated color signal; means for comparing the outputs of the first and second means for providing a control signal indicative of the relative amplitudes of the output signals from the first and second means; and
   control means for applying the control signal obtained from the comparing means to the color processing channel for controlling the operation thereof.

2. The combination according to claim 1 wherein the comparing means is a differential amplifier having a pair of inputs, with the output of the first means being applied to one of the inputs and with the output of the second means being applied to the other of the inputs.

3. The combination according to claim 1 wherein the first and second means each include peak detectors having integrating circuits therein.

4. The combination according to claim 1 wherein the color processing channel of the television receiver includes an IF amplifier stage and where the control signal is applied to the IF amplifier stage to vary the operating bias for the color IF amplifier.

5. The combination according to claim 4 wherein the control means includes an additional integrating circuit and wherein the comparing means is a differential amplifier providing a first output whenever the magnitude of the brightness signal components exceeds the magnitude of the demodulated color signal and for providing a second output whenever the magnitude of the demodulated color signal exceeds the magnitude of the brightness signal components.

6. The combination according to claim 1 further including first and second inverter circuits, a second comparing means connected to the outputs of the first and second signal obtaining means through the first and second inverter circuits, respectively, for providing a second control signal indicative of the relative amplitudes of the inverted output signals from the first and second means, said first and second comparing means being similar, and a second control means for applying the control signal obtained from the second comparing means to the color processing channel for controlling the operation thereof.

7. The combination according to claim 6 wherein the control means each include an integrating circuit for providing respective control signals representative of the outputs of the comparing means.

8. The combination according to claim 7 wherein the comparing means each are differential amplifiers, each having a pair of inputs to which the outputs of the first and second means are applied and each providing a first outputs signal whenever the amplitude of the applied output of the first means exceeds the amplitude of the applied output of the second means, and each providing a second output signal whenever the amplitude of the applied output of the second means exceeds the amplitude of the applied output of the first means, and further including switching means, in each of said control means, with the output of the switching means being controlled by the control signal obtained from the respective differential amplifier and being applied through the integrating circuits in said control means to the color processing channel for controlling the operation thereof.

9. The combination according to claim 8 wherein each of the switching means is rendered conductive whenever the second output is obtained from the corresponding differential amplifier and is rendered nonconductive whenever the first output is obtained from the corresponding differential amplifier to thereby vary the signal level applied through the integrating circuits to the color processing channel to vary the gain thereof accordingly.

10. The combination according to claim 9 wherein the outputs of the first and second comparing means both are combined for controlling the color processing channel.

11. In a color television receiver for a composite television signal comprising brightness signal components of a television image and a subcarrier signal modulated by color difference signals representing hue and saturation of the image at different phases of the subcarrier, said receiver having a brightness signal processing channel including a video amplifier and a color signal processing channel including a color IF amplifier, said receiver further including at least one demodulator circuit for demodulating the subcarrier signal of one phase to develop a signal representative of the saturation of one hue, an automatic color control circuit including in combination:

a first peak detecting circuit connected to the output of the video amplifier for providing an output signal representative of the peak amplitude of the brightness signal components;

a second peak detector connected to the output of the demodulator for providing an output signal representative of the peak saturation of said one hue;

a differential amplifier circuit having first and second inputs, with the output of the first peak detector being connected to one of the inputs and with output of the second peak detector being connected to the other of the inputs; and means responsive to the output of the differential amplifier for controlling the gain of the IF amplifier in the color processing channel.

12. The combination according to claim 11 wherein the peak detectors each include an integrating circuit having a long time constant, said time constant extending over several frames of a received television signal.

13. The combination according to claim 11 wherein the received signal has trace and retrace intervals and wherein the television receiver further includes a blanking circuit for blanking the cathode ray tube during retrace intervals of the received television signal, further including means responsive to the blanking circuit for disabling erroneous operation of the differential amplifier during the blanking intervals.

14. The combination according to claim 11 wherein said color television receiver includes a plurality of demodulator circuits for demodulating each of a plurality of different phases of the subcarrier signal, further including OR gate circuits responsive to the outputs of all of said demodulators for providing the input signal to the second peak detector.